Figure 1:
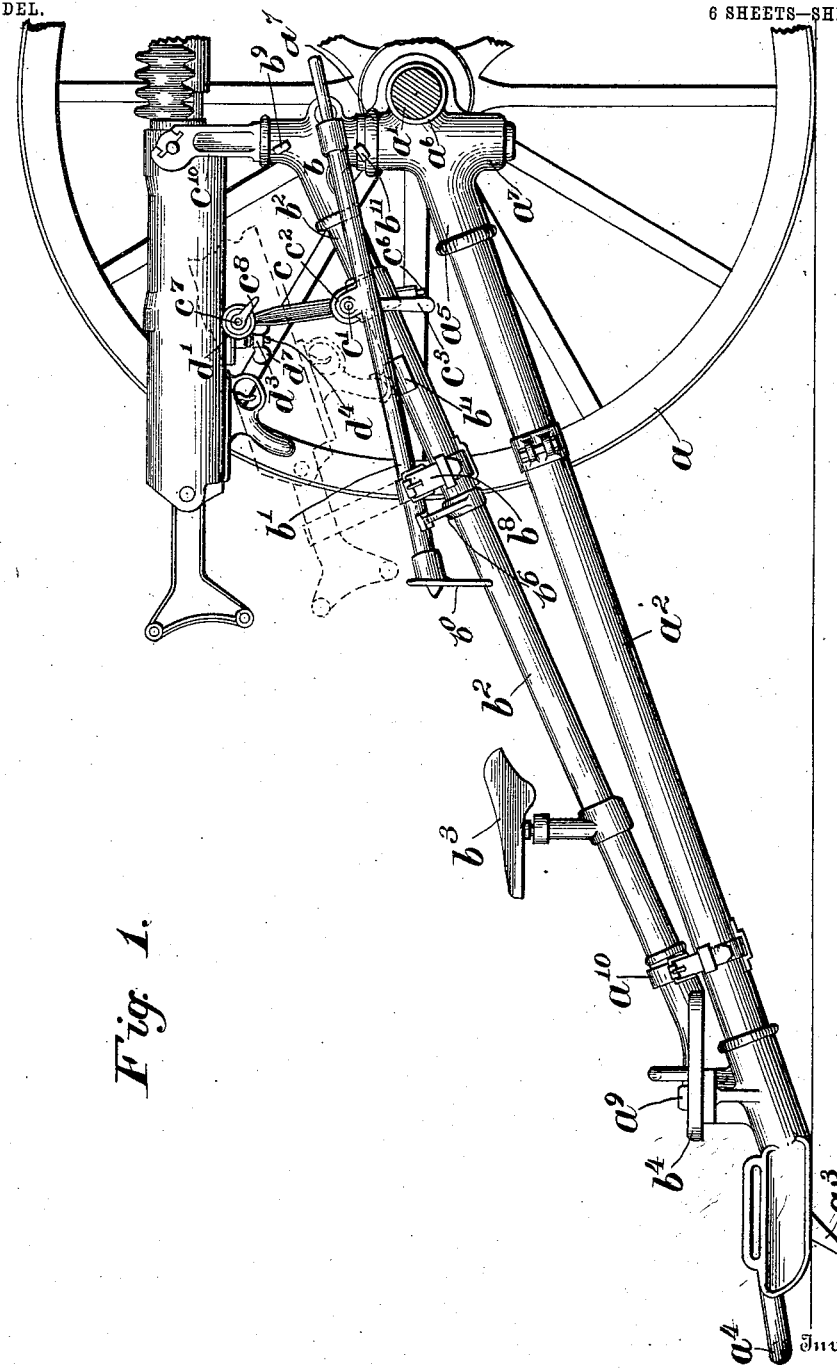

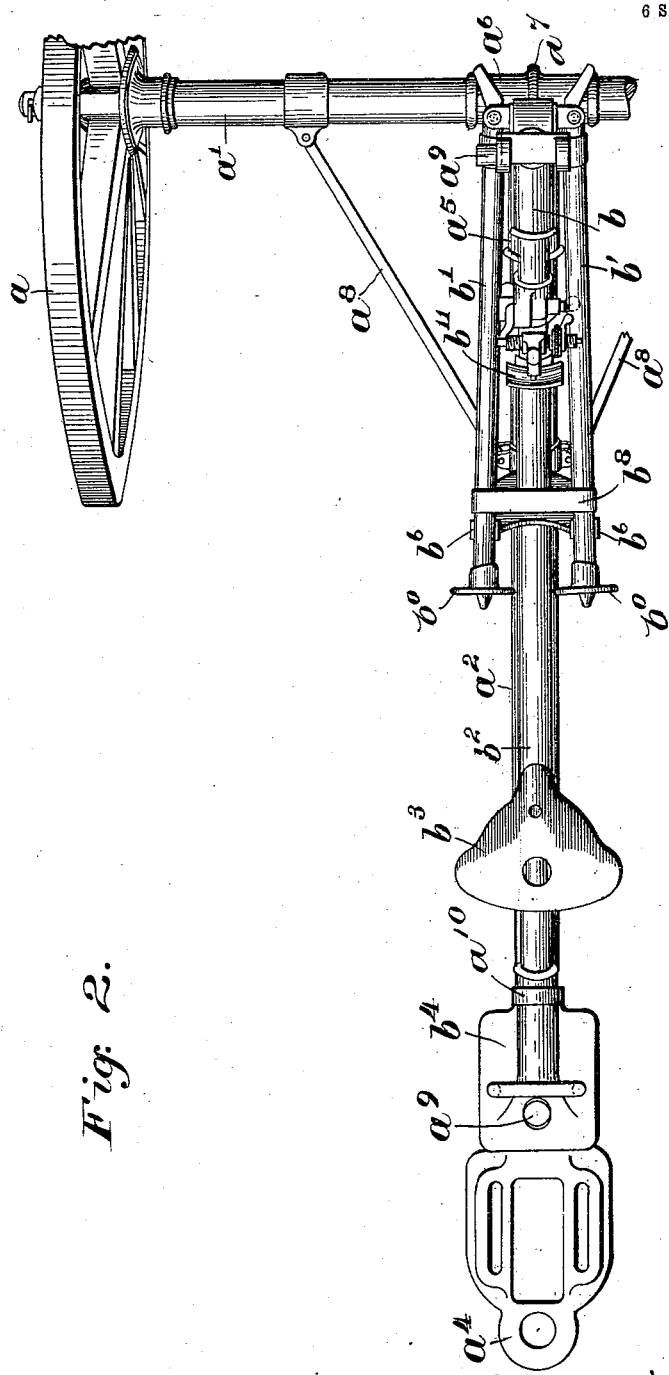

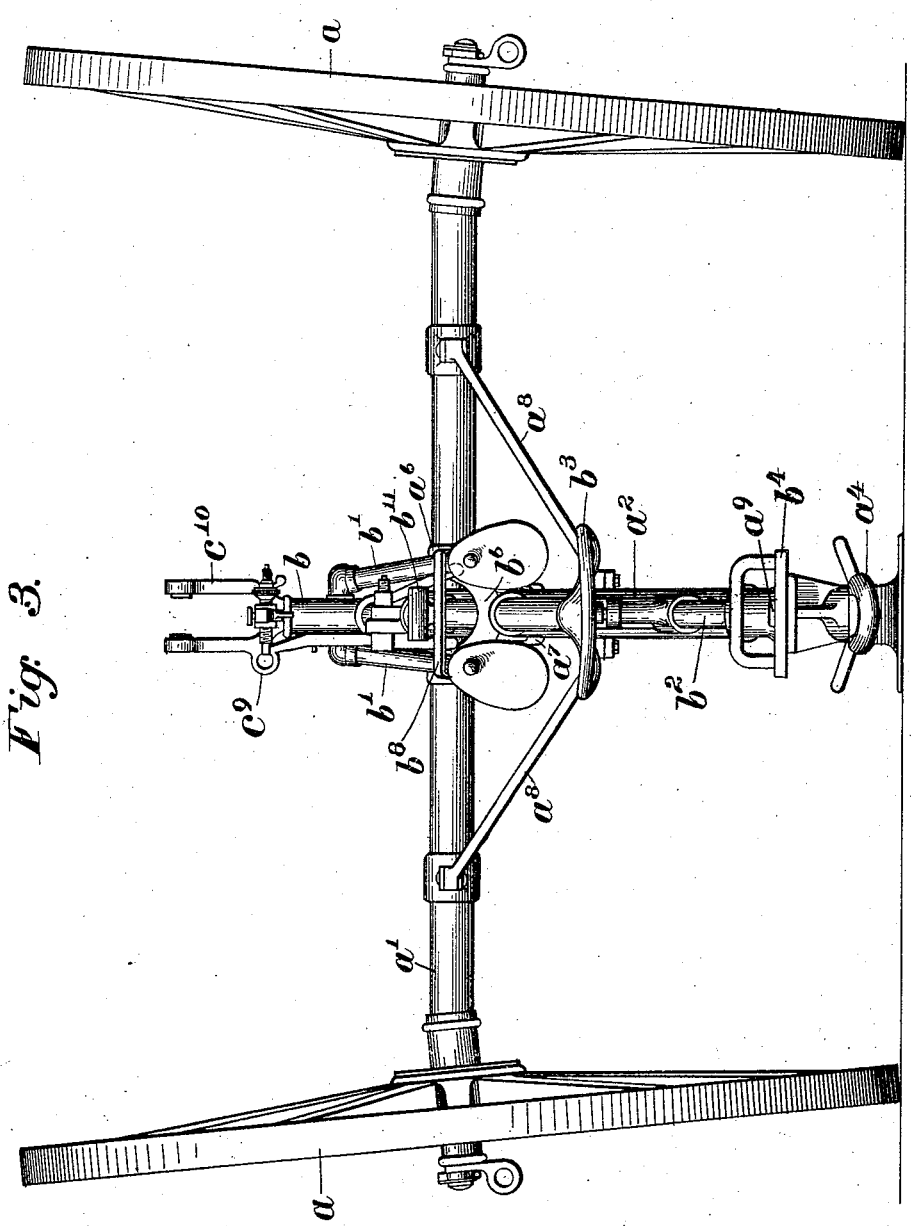

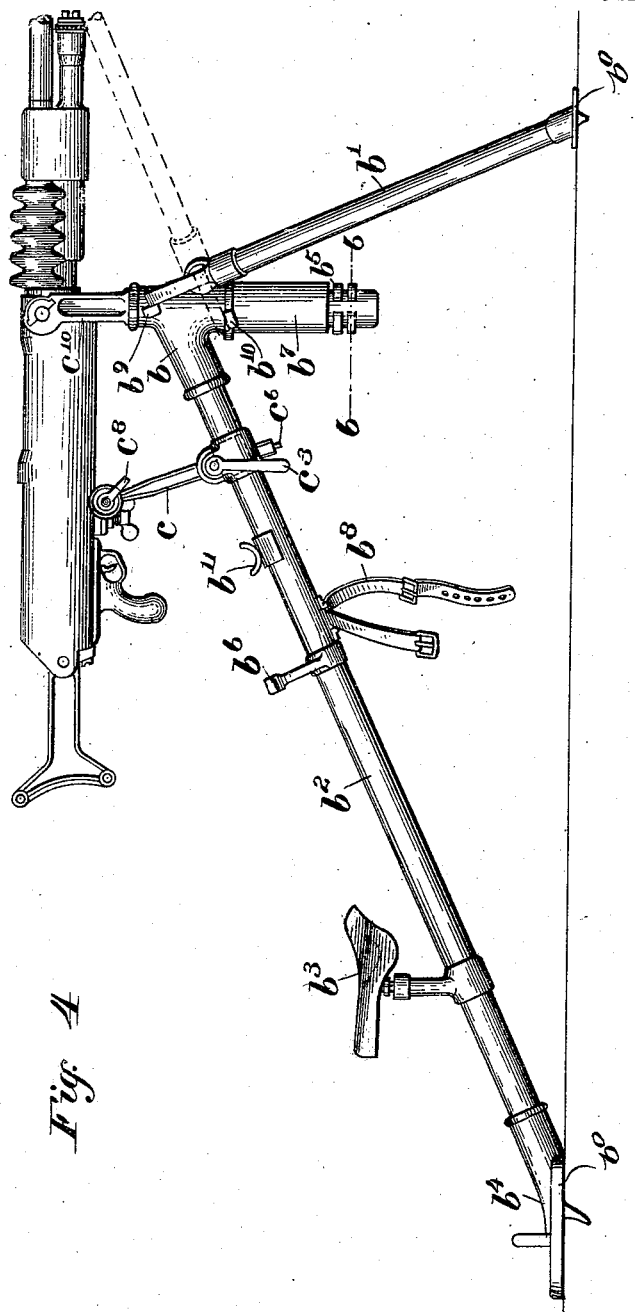

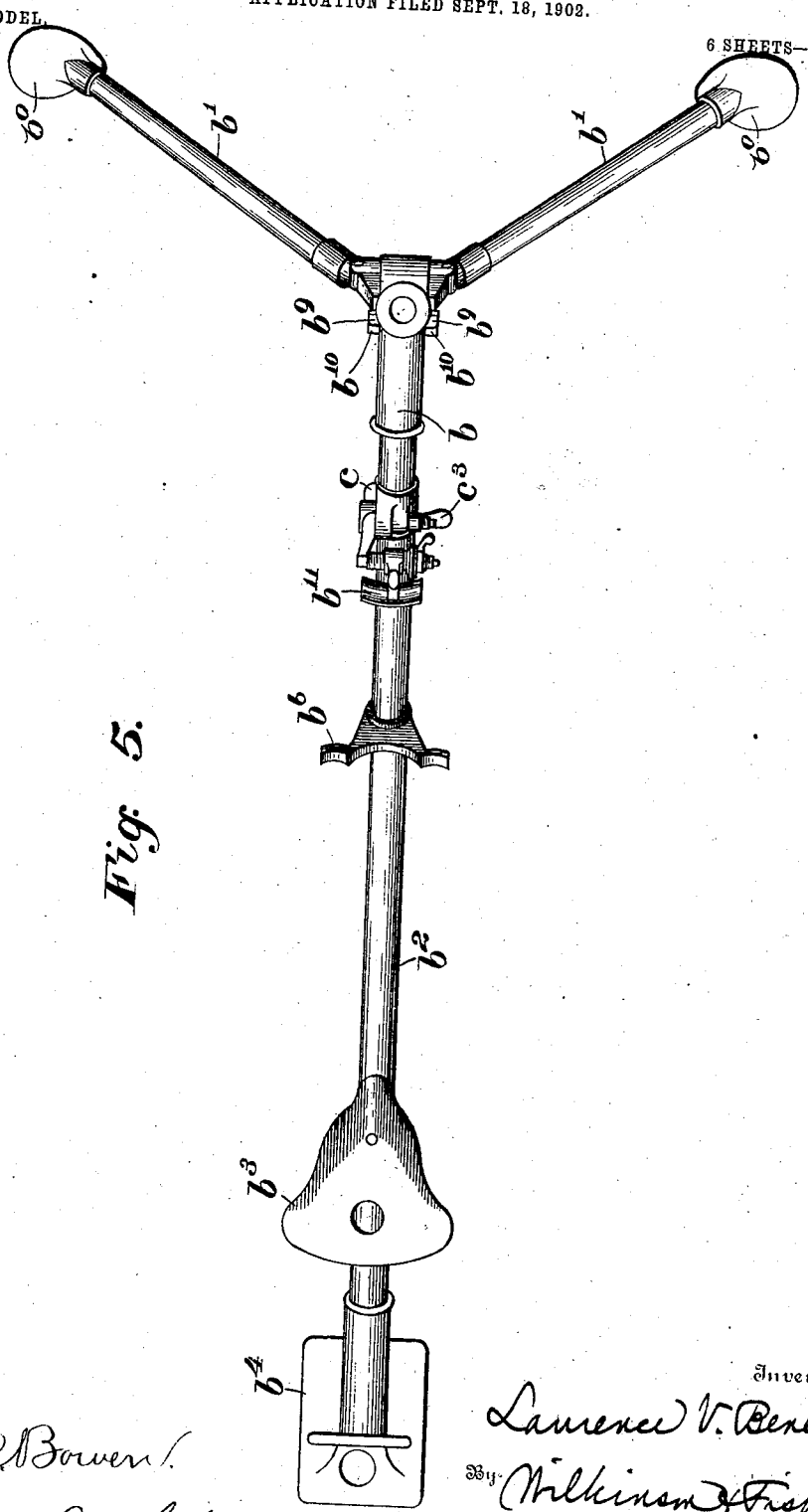

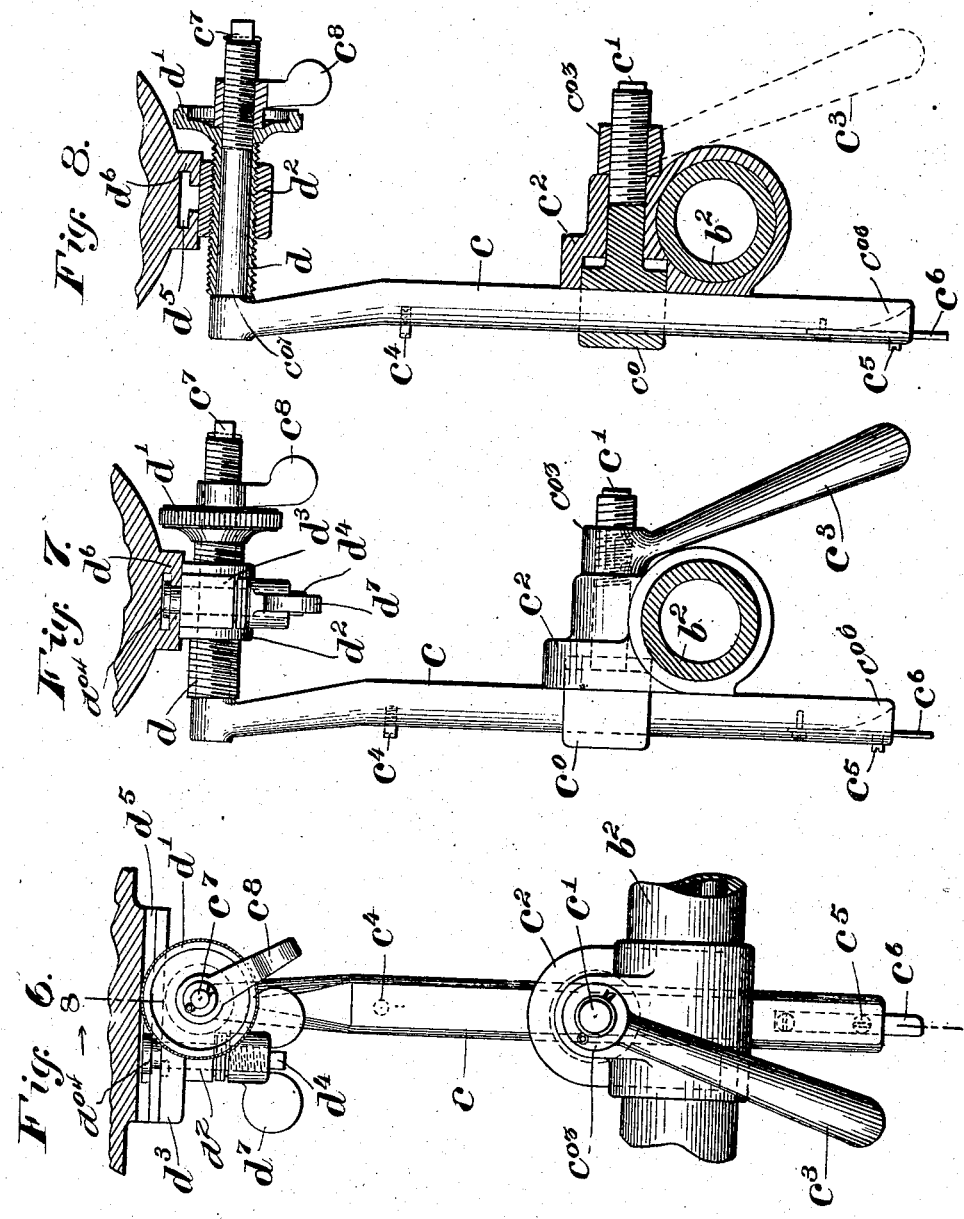

UNITED STATES PATENT OFFICE.

LAURENCE V. BENÉT, OF PARIS, FRANCE.

FIELD-MOUNT FOR AUTOMATIC MACHINE-GUNS.

SPECIFICATION forming part of Letters Patent No. 718,900, dated January 20, 1903.

Application filed September 18, 1902. Serial No. 123,936. (No model.)

*To all whom it may concern:*

Be it known that I, LAURENCE V. BENÉT, a citizen of the United States, residing at Paris, in the Republic of France, have invented certain new and useful Improvements in Field-Mounts for Automatic Machine-Guns or Light Artillery; and I do hereby declare the following to be a full, clear, and exact description of the invention, such as will enable others skilled in the art to which it appertains to make and use the same.

My invention relates to improvements in field-mounts for machine-guns or for other light artillery; and it is more especially intended for use with machine-guns or automatic guns of the smaller calibers in which the piece does not recoil.

The mount constructed according to my present invention is intended to supply the need for a mount which may be used with either artillery or infantry and in which the piece may be either mounted on wheels and dragged about by horses or by men or which may be removed from the wheels and transported from place to place, stretcher fashion. Thus the piece may be used with cavalry in all places accessible to cavalry and may be transported over obstructions by hand in spots inaccessible to mounted troops and may be fired from a mount independent of the wheels. In order to accomplish this, the gun-mount has been divided into two distinct parts. The upper part is in the form of a complete tripod carrying the piece, and the lower part serves as a support and normally as a vehicle for the tripod. A simple and rapid operation permits the separation or the assembling of these two parts composing the mount.

My present invention also includes certain novel features for pointing the piece, both in elevation and in train, without disturbing the position of either the tripod or of the lower carriage.

My invention will be understood by reference to the accompanying drawings, in which the same parts are indicated by the same letters throughout the several views.

Figure 1 represents a side elevation, partly in section, the parts being broken away, of the gun and mount. Fig. 2 is a plan view of the mount, the gun being removed. Fig. 3 is a rear view of the mount, the gun being omitted. Fig. 4 is a side elevation showing the piece mounted on a tripod and detached from the lower carriage. Fig. 4$^a$ represents a section along the line 6 6 of Fig. 4 and looking down. Fig. 5 is a plan view of the tripod shown in Fig. 4 with the gun removed, and Figs. 6, 7, and 8 show details of the apparatus for elevating and training the piece irrespective of the movement of the mount.

The lower carriage is constructed in such a manner as to readily receive the tripod or upper carriage, and comprises the wheels $a$, mounted on the axle $a'$, and the tubular trail $a^2$, terminated by a shoe having the spade $a^3$ and the eye for the drag-rope $a^4$. The trail $a^2$ is secured to the axle $a'$ by means of a T-shaped connection, which is provided with a socket $a^5$ for the trail and with an eye $a^6$ for the axle and also a socket $a^7$ to receive the pivot-pin of the tripod. The axle and the trail are preferably riveted to the connection-piece, and to secure greater rigidity braces $a^8$ connect the axle and the trail $a^2$.

The upper carriage is composed, essentially, of a tripod the three legs of which are hinged together in any suitable or convenient manner. This may be done in a variety of ways, one of which is shown in the accompanying drawings.

A socket-piece $b$ has connected thereto by universal joints the two short tripod-legs $b'$ $b'$ and has rigidly secured thereto the longer tripod leg or trail $b^2$, which is preferably provided with a seat $b^3$ for the person firing the piece and with a shoe $b^4$. The forward tripod-legs also have shoes $b^0$, and these shoes are preferably provided with prongs to engage in the ground when the tripod is removed from the upper carriage, as indicated in Fig. 4. This tripod is provided with mechanism for elevating and training the piece within certain limits, which will be hereinafter described with special reference to Figs. 6, 7, and 8.

When the tripod is mounted on the lower carriage, either for moving the piece or for firing the same, its pivot $b^7$ is engaged in the socket $a^7$ of the lower carriage, the parts being preferably connected together by a bayonet-joint $b^5$, (see Figs. 4 and 4$^a$;) but any other means for connecting the tripod with the lower carriage may be adopted, if desired. When thus mounted on the lower carriage, the two forward legs $b'$ $b'$ of the tripod are bent backward and rest on a V-shaped support $b^6$, fast to the trail $b^2$ of the tripod. This trail rests on its shoe $b^4$, which is supported by the shoe of the trail, and is held in place by a stud $a^9$, projecting into an eye in the said shoe $b^4$. The resiliency of the tripod-trail $b^2$ enables its shoe to be lifted up slightly and to be sprung over this stud $a^9$, and thus the two trails of the upper and lower carriage are securely connected together. Thus it will be seen that the bayonet-joint prevents the tripod from being lifted from the lower carriage, and the stud $a^9$ prevents any lateral disarrangement of the trail $b^2$.

As a further protection against any disarrangement while firing or while in transport straps $b^8$ and $a^{10}$ are provided. The strap $b^8$ holds the two tripod-legs $b'$ secured in the elevated position, as shown in Fig. 1, while the strap $a^{10}$ prevents the shoe $b^4$ from being accidentally thrown out of engagement with the stud $a^9$.

To raise the tripod from the lower carriage, loose the straps $a^{10}$ and $b^8$, turn the two tripod-legs $b'$ $b'$ from the rear to the forward position to the position indicated in full lines in Figs. 4 and 5, then disengage the shoe $b^4$ from the stud $a^9$, and turn the trail $b^2$ about sixty degrees to the left, thus disengaging the bayonet-joint $b^5$. The tripod may now be lifted bodily from the lower carriage and set up, as shown in Fig. 4. When thus set up, the upper ends of the tripod-legs $b'$ engage the studs $b^9$. If it is desired to carry the piece with its tripod any distance, it will be more convenient to carry the same litter fashion or like a hand-barrow, and this may be done by swinging the tripod-legs $b'$ slightly inward each other, enabling their upper ends to clear the studs $b^9$, and then swinging these tripod-legs forward to the position indicated in dotted lines in Fig. 4. Their short arms will then engage the stops $b^{10}$. (See Fig. 4.)

Should it be desired to secure the gun to the trail of the tripod when in transit, the elevating-gear may be thrown out of engagement, as will be hereinafter described, and the gun may be lowered into the holder $b^{11}$ and then secured in place by means of the straps $b^8$, or a separate strap may be used, if desired.

In order to put the tripod back on the lower carriage, the hereinbefore-described operation is performed in the reverse order.

Referring now to the mechanism for elevating the gun and for training the same through a small angle while mounted either on the tripod or on the carriage, Fig. 6 is a side elevation. Fig. 7 is view of the device shown in Fig. 6 as seen from the left of said figure, and Fig. 8 shows a section along the line 8 8 of Fig. 6 and looking in the direction of the arrows, the parts being shown in elevation. This mechanism consists, essentially, of a stem $c$, whose height may be adjusted at will, while its head carries adjusting devices, by means of which the gun may be trained through a small angle to the right or left, or by means of which it may be allowed to vibrate laterally either for training from the shoulder or for "fan-fire." This stem $c$ passes through a clamp-sleeve $c^0$, which sleeve has a screw-threaded shank $c'$, engaged by the nut $c^{03}$, integral with the arm $c^3$. This shank passes through the bracket $c^2$, fast to the tripod-trail $b^2$. It will be seen that by turning this arm $c^3$ in one direction or the other the stem $c$ may be clamped against the face of said bracket or released therefrom, and thus the stem may be readily moved up or down to adjust for elevation and clamped in the desired position. The travel of this stem $c$ in the sleeve $c^0$ is limited by the stops $c^4$ and $c^5$, the lower one of which is preferably integral with a spring $c^6$, fast to the stem $c$, which spring may be bent into a recess $c^{06}$ (shown in dotted lines in Figs. 7 and 8) when it is desired to slip the said stem entirely through the said sleeve. This may be desirable either in transporting the piece or when one wishes to fire from the shoulder. Thus it will be seen that a quickly-adjustable elevating apparatus is provided. With this elevating apparatus I provide mechanism for training the piece through a small angle laterally without disturbing the carriage or for allowing the piece a slight lateral vibration, as would be desirable in covering roads, bridges, or the like, or a small front of advancing troops, thus providing for what is technically known as "fan-fire." This training mechanism comprises an arm $c^7$ at substantially right angles to the stem $c$ and screw-threaded near its outer end, on which screw-threaded portion the thumb-nut $c^8$ is mounted. Between this thumb-nut and the stem $c$ is a screw-threaded sleeve $d$, which fits loosely over the arm $c^7$ and is turned by means of a milled head $d'$. The outer screw-threaded portion of this sleeve engages in a nut $d^2$, integral with the plate $d^3$, in which plate is mounted the pin $d^4$, having an enlarged head $d^{04}$, engaging in the guideway $d^5$ in the lug $d^6$ beneath the gun. The nut $d^7$ fits over the screw-threaded end of this pin $d^4$, and thus holds the plate $d^3$ in position. It will be seen that if the thumb-nut $c^8$ be turned so as to bind the sleeve $d$ between the said nut and the shoulder $c^{07}$ of the stem $c$ and said sleeve be turned by means of the milled head $d'$ this turning will move the nut $d^2$, and consequently the breech of the gun, to the right or left, thus enabling a slight amount of train to be given to the gun without disturbing the carriage. Now if the thumb-nut $c^8$ be eased up the sleeve $d$ will be free to slide on the arm $c^7$, and the gun may be trained to the right or left without using the training-gear. Thus it may be trained from the shoulder, or one of the well-known attachments for fan-fire may be applied to the gun without taking off the training-gear.

It will be seen that if the stem $c$ is slipped out of the sleeve $c^0$ in the manner already described both this elevating and training mechanism are at once thrown out of action, and the gun may be pointed from the shoulder without being impeded by said mechanism. When the stem $c$ it thus disengaged, it is put into the eye $c^9$ (see Fig. 3) on the yoke of the gun-mount, where it remains out of the way when the herein-described elevating and training gear is not in use.

It will be obvious that various modifications might be made in the herein-described apparatus which could be used without departing from the spirit of my invention.

Having thus described my invention, what I claim, and desire to secure by Letters Patent of the United States, is—

1. In a gun-mount, the combination of the wheels and axle, a trail connected to said axle with a lug near the rear end thereof, a tripod having two short front legs adapted to fold rearward and a long rear leg provided with a shoe with an eye therein adapted to engage said lug on the trail, a bayonet-joint connecting said tripod and said trail, and a gun mounted on said tripod, substantially as described.

2. The combination with the lower carriage, of a tripod mounted thereon, a bayonet-joint connecting said tripod and said lower carriage, and a gun mounted on said tripod, substantially as described.

3. The combination with the lower carriage mounted on wheels, of a tripod mounted thereon, a bayonet-joint connecting said tripod and said lower carriage, a gun mounted on said tripod, and elevating and training gear connecting said gun and said tripod, substantially as described.

4. The combination with the lower carriage mounted on wheels, of a tripod mounted on said lower carriage and provided with hinged front legs and a rigid rear leg, of a bayonet-joint connecting said tripod to said lower carriage, and a gun mounted on said tripod, substantially as described.

5. In a gun-mount, the combination of the wheels and axle, a trail connected to said axle with a lug near the rear end thereof, a tripod mounted on said trail and having two short front legs adapted to fold rearward and a long rear leg provided with a shoe with an eye therein adapted to engage said lug on the trail, a quickly-detachable connection between said tripod and said trail, and a gun mounted on said tripod, substantially as described.

6. In a gun-mount of the character described, the combination with a lower carriage mounted on wheels, of a tripod, a bayonet-joint connecting said tripod and said lower carriage, a gun mounted on said tripod, and elevating and training gear connecting said gun and said tripod and removable at will, substantially as described.

7. In a gun-mount, the combination of the wheels and axle, a trail connected to said axle with a lug near the rear end thereof, a tripod mounted on said trail and having two short front legs adapted to fold rearward and a long rear leg provided with a shoe with an eye therein adapted to engage said lug on the trail, a strap binding said long leg and said trail together, and a gun mounted on said tripod, substantially as described.

8. The combination with the lower carriage mounted on wheels, of a tripod removably connected to said lower carriage and provided with hinged front legs, a rigid rear leg, and a support $b^{11}$ on said rear leg for the breech of the gun when in transit, substantially as described.

9. The combination with the lower carriage mounted on wheels, of a tripod removably connected to said lower carriage and provided with hinged front legs, a rigid rear leg, and a support $b^{11}$ on said rear leg for the breech of the gun when in transit, with a strap securing the three legs of the tripod together and holding the gun down on said support $b^{11}$, substantially as described.

10. The combination with the lower carriage mounted on wheels, of a tripod removably connected to said lower carriage and provided with hinged front legs, a rigid rear leg and a support $b^{11}$ on said rear leg for the breech of the gun when in transit, a gun mounted on said tripod, and elevating and training gear normally connecting said gun and said tripod, but removable when desired, substantially as described.

11. The combination with the lower carriage mounted on wheels, of a tripod removably connected to said lower carriage and provided with hinged front legs, a rigid rear leg and a support $b^{11}$ on said rear leg for the breech of the gun when in transit, a gun mounted on said tripod, and elevating and training gear normally connecting said gun and said tripod but removable when desired, with a strap securing the three legs of the tripod together and holding the gun down in said support, substantially as described.

12. The combination with the lower carriage mounted on wheels, of a tripod mounted on said lower carriage and provided with hinged front legs and a rigid rear leg, with stops on the head of said tripod to limit the travel of said hinged legs, of a bayonet-joint connecting said tripod to said lower carriage, and a gun mounted on said tripod, substantially as described.

In testimony whereof I affix my signature in presence of two witnesses.

LAURENCE V. BENÉT.

Witnesses:
CHARLES KEEVER,
ALFRED CLÉRICEAU.